(12) United States Patent
Blankenship et al.

(10) Patent No.: US 7,115,832 B1
(45) Date of Patent: Oct. 3, 2006

(54) MICROPLASMA SPRAY COATING APPARATUS

(75) Inventors: Donn R. Blankenship, Southbury, CT (US); Gary Shubert, East Hampton, CT (US); Paul H. Zajchowski, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/190,135

(22) Filed: Jul. 26, 2005

(51) Int. Cl.
*B23K 10/00* (2006.01)

(52) U.S. Cl. .................. 219/121.48; 219/121.47; 219/76.16; 219/121.58; 427/446

(58) Field of Classification Search .......... 219/121.47, 219/121.36, 121.48, 121.45, 121.46, 76.15, 219/76.16, 121.59; 427/366, 455, 456, 446; 118/723 R, 723 MW
See application file for complete search history.

(56) References Cited

U.S. PATENT DOCUMENTS

| | | | |
|---|---|---|---|
| 4,256,779 A | 3/1981 | Sokol et al. | |
| 4,739,146 A * | 4/1988 | Lindland et al. | 219/121.59 |
| 5,489,234 A * | 2/1996 | Hockett | 451/87 |
| 5,723,078 A | 3/1998 | Nagaraj et al. | |
| 5,798,496 A * | 8/1998 | Eckhoff et al. | 219/121.36 |
| 6,042,880 A | 3/2000 | Rigney et al. | |
| 6,503,379 B1 * | 1/2003 | Kidd et al. | 204/298.05 |
| 6,571,472 B1 | 6/2003 | Berry et al. | |
| 6,642,472 B1 * | 11/2003 | Hanus | 219/121.36 |
| 6,744,005 B1 * | 6/2004 | Beyer et al. | 219/121.41 |
| 6,774,338 B1 * | 8/2004 | Baker et al. | 219/121.64 |
| 6,914,210 B1 | 7/2005 | Grossklaus, Jr. et al. | |
| 7,008,522 B1 | 3/2006 | Boucard et al. | |
| 2004/0164682 A1 * | 8/2004 | Hopwood et al. | 315/111.21 |
| 2005/0008550 A1 * | 1/2005 | Duan | 422/186.04 |
| 2005/0015980 A1 * | 1/2005 | Kottilingam et al. | 29/888.011 |

OTHER PUBLICATIONS

European Search Report for EP Patent Application No. 05256731.0.

* cited by examiner

*Primary Examiner*—Mark Paschall
(74) *Attorney, Agent, or Firm*—Bachman & LaPointe, P.C.

(57) ABSTRACT

A portable, hand-held microplasma spray coating apparatus comprises an anode, a cathode and an arc gas emitter disposed in a housing, and a powder feeding system, a cooling system and a power source connected to the apparatus. The powder feeding system, cooling system and power source are detachably mounted on a mobile platform. The microplasma spray apparatus can be transported to on-site locations in the field to facilitate quick repair work.

30 Claims, 4 Drawing Sheets

MICROPLASMA SPRAY COATING APPARATUS

CROSS REFERENCE TO RELATED APPLICATIONS

This application relates in part to U.S. patent application Ser. No. 10/976,651 to Zajchowski, et al. entitled "Method and Apparatus for Microplasma Spray Coating a Portion of a Compressor Blade in a Gas Turbine Engine" filed on Oct. 29, 2004; U.S. patent application Ser. No. 10/976,560 to Zajchowski, et al. entitled "Method and Apparatus for Microplasma Spray Coating a Portion of a Turbine Vane in a Gas Turbine Engine" filed on Oct. 29, 2004; U.S. patent application Ser. No. 10/976, 969 to Zajchowski, et al. entitled "Method and Apparatus for Repairing Thermal Barrier Coatings" filed on Oct. 29, 2004; and U.S. patent application Ser. No. 10/527,726 to Zajchowski, et al. entitled "Methods for Repairing Workpieces Using Microplasma Spray Coating" and filed on Jul. 26, 2005.

FIELD OF THE DISCLOSURE

The present disclosure generally relates to a portable, hand-held microplasma spray coating apparatus, and more particularly, a portable, hand-held microplasma spray coating apparatus for use in the field.

BACKGROUND OF THE DISCLOSURE

Generally, conventional plasma spray coating methods and apparatus are utilized in controlled environments. These controlled environments typically consist of a booth, room, or other enclosure in a facility. Such containment is necessary when employing conventional plasma spray coating apparatus due to at least the noise level generated during operation. Presently, United States Government regulations require an operator utilize hearing protection when operating equipment generating a noise level of 85 decibels or more. Conventional plasma spray coatings apparatus operate at noise levels of approximately 120 decibels or more. Conventional plasma spray coating apparatus are also imprecise at applying their plasma spray coatings due to the size and width of the plasma spray itself. Due to the imprecise nature of applying plasma spray coatings, the plasma spray coating apparatus must be utilized and operated in some type of operating enclosure in order to prevent environmental and safety hazards.

There is a need for a plasma spray coating apparatus capable of being transported or being portable in nature to permit spray coating repairs in the field while adhering to United States regulations and providing acceptable spray coating quality.

SUMMARY OF THE INVENTION

In accordance with the present invention, a portable, hand-held microplasma spray coating apparatus broadly comprises an anode, a cathode and an arc gas emitter disposed in a housing of a microplasma spray gun; a powder feeding system connected to the housing; a cooling system connected to the housing; and a power source connected to the apparatus, wherein the powder feeding system, cooling system and power source are detachably mounted on a mobile platform.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

A portable, hand-held microplasma spray coating apparatus described herein may be utilized for applying microplasma spray coatings to a variety of workpieces for many applications. The portable microplasma spray coating apparatus described herein measures approximately 3 ft. wide and 5 ft. long and weighs approximately 150 lbs. In contrast, conventional plasma spray coating apparatus are mounted in a booth or similar enclosure within a stationary facility. Consequently, the size and scale of the portable microplasma spray coating apparatus permit an operator, technician or other to detachably mount, that is, attach and/or detach, the apparatus to and from one mobile platform to another mobile platform.

It is contemplated that the microplasma spray coating apparatus described herein may be mounted on a mobile platform such as a vehicle, and transported to on-site locations to quickly facilitate repair work. As an example, a technician may employ an automobile, truck, or even a motorized cart, or may transport the portable microplasma spray coating apparatus on an airborne vehicle such as an airplane, helicopter and the like; all such vehicles are contemplated as mobile platforms capable of transporting the microplasma spray coating apparatus described herein. Since the microplasma spray coating apparatus includes a power source, the technician can activate the apparatus on-site and begin using it immediately. The apparatus may be equipped with conduits, or hoses, having lengths sufficient to permit the technician to walk or climb a distance with the hand-held microplasma spray gun.

For example, in the aircraft industry, gas turbine engines eventually wear and the ceramic or metallic coatings of parts, shrouds, and the like, erode. A technician equipped with the microsplasma spray apparatus described herein may repair such worn turbine engine parts while the engine is still mounted to the aircraft's wing and the aircraft parked on a runway or in a hangar. Certain gas turbine engines are even large enough to accommodate a person such that a technician may walk or crawl into the turbine engine. The technician may then apply the microplasma spray coating to the worn and eroded parts, shrouds, and the like without incurring additional time and manpower to remove the engine from its moorings on the aircraft. In addition, it is contemplated that other turbine applications, such as industrial gas turbines, may also be repaired on-site in the field. Such industrial gas turbines are commonly utilized in pumping systems for power plants. A technician may transport the microplasma spray coating apparatus to a location on-site within the power plant or even to a remote location containing the power plant's equipment.

Figure 1:
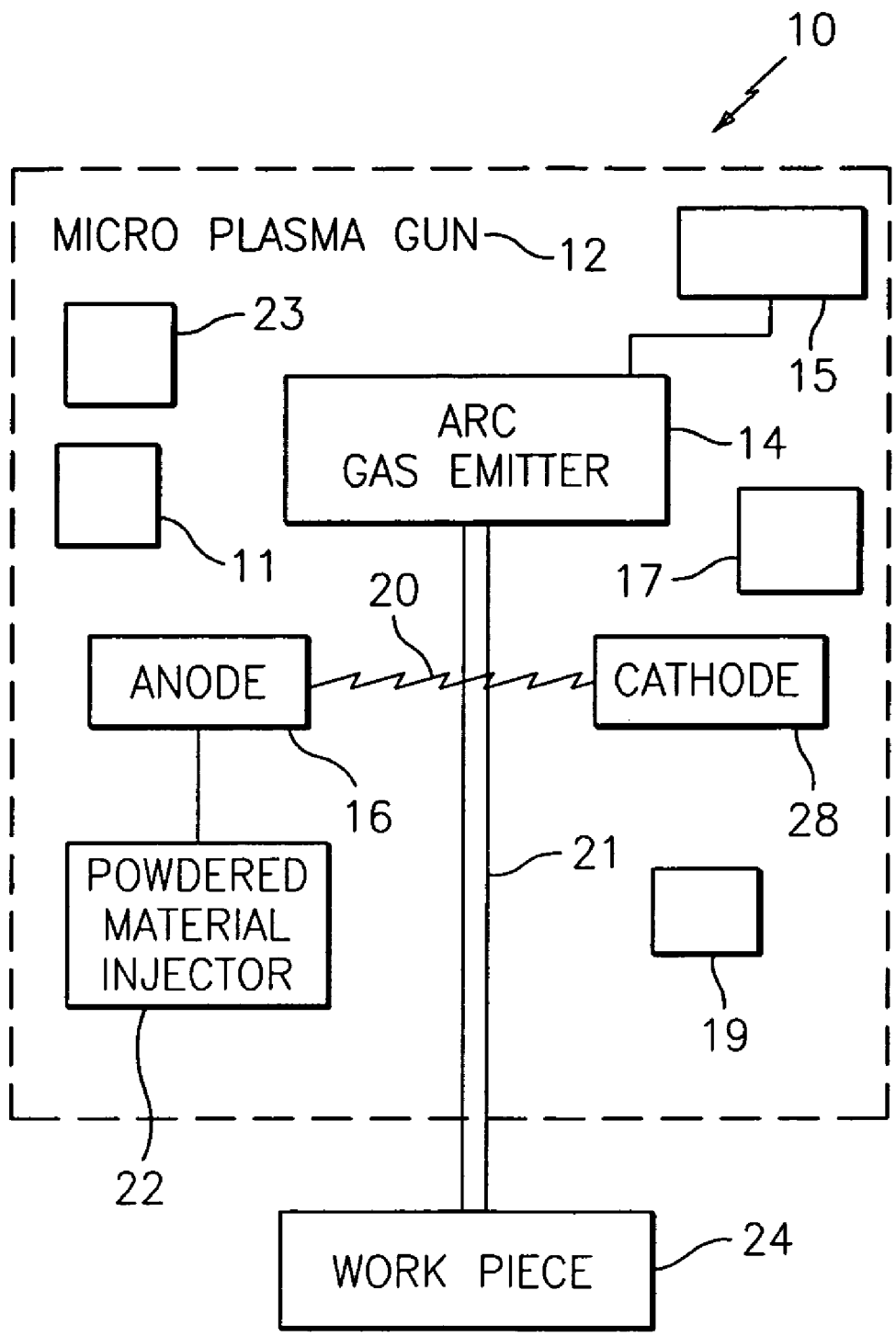
FIG. 1 is an illustration representing a microplasma spray coating apparatus of the present invention.
Figures 2, 3:
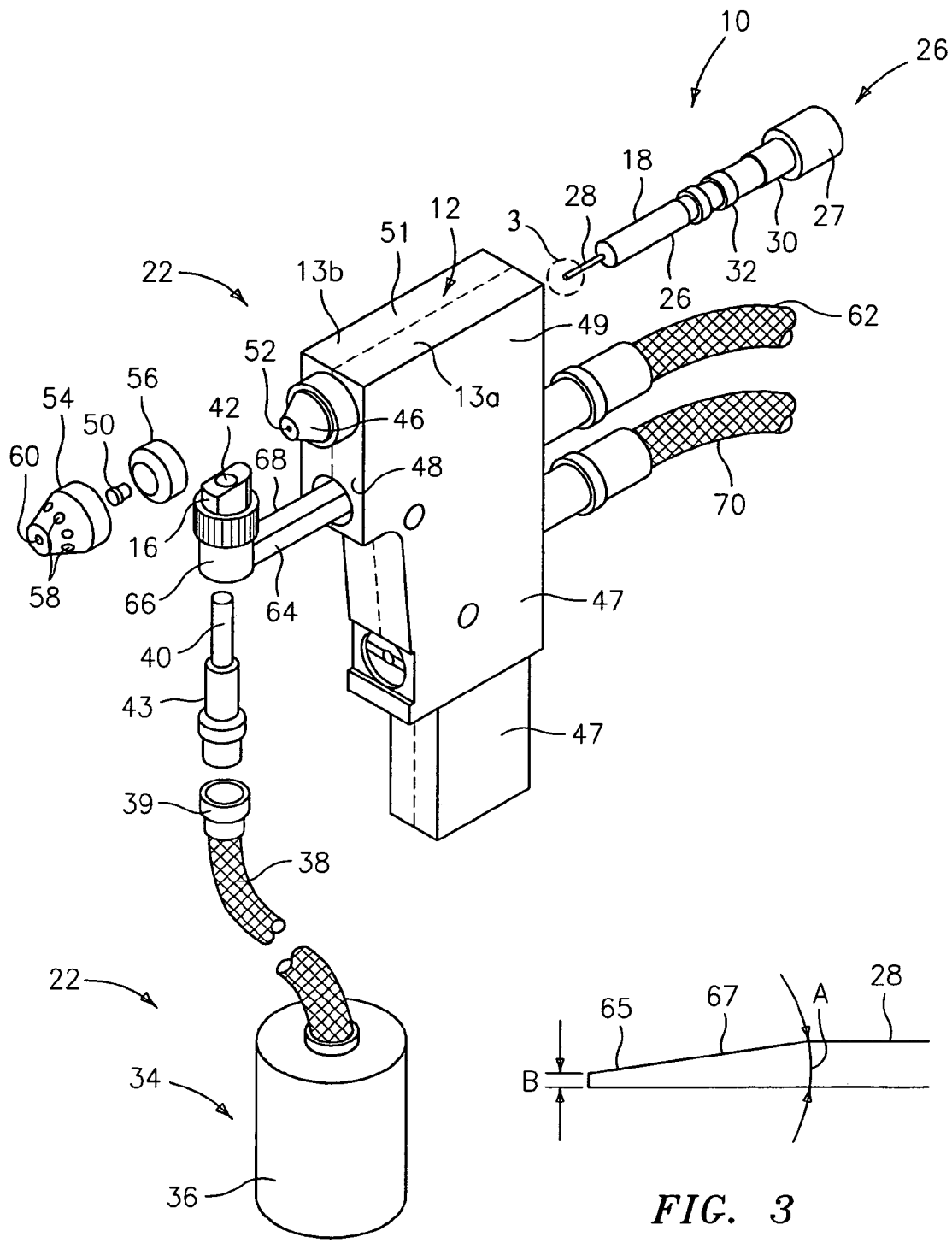
FIG. 2 is an exploded, perspective view of the microplasma spray coating apparatus of FIG. 1.
FIG. 3 is an enlarged view of an electrode depicted in the microplasma spray coating apparatus of FIG. 2.

Referring now to FIGS. 1 and 2, a microplasma spray coating apparatus 10 schematically represented by the dashed box outline is depicted. Generally, microplasma spray coating apparatus 10 may comprise a microplasma gun 12 having a housing 13 containing an arc gas emitter 14, an anode 16, and a cathode 28. An electric arc 20 is generated between the anode 16 and cathode 28. A plasma stream 21 is formed when a quantity of arc gas is injected from the arc gas emitter 14 through the arc 20. A powdered material injector 22 dispenses a quantity of powdered material into the plasma stream which transports the powdered material to a workpiece 24. An arc gas source 15, a powder feeding system 23, a cooling fluid system 11 and a power source 17 are all connected to microplasma gun 12. The power source may operate in a power range necessary to perform the intended application of microplasma spray coating apparatus 10. Preferably, the power source operates at a relatively low power range of about 0.5 kilowatts to about 4 kilowatts. The power source may comprise any power source capable of providing the aforementioned desired power ranges, and includes a power cord to engage various sized power outlets. A filter system 19 for collecting excess microplasma spray and/or powder material may be included in apparatus 10. Filter system 19 generally comprises a high efficiency particulate air filter having a hand held vacuum capable of removing excess powder from the air attached to a collection area, for example, a bag or container, where the excess powder is collected. Filter system 19 is preferably mounted to the mobile platform along with apparatus 10.

Referring now to FIG. 2, the housing of microplasma gun 12 may comprise a grip portion 47, a forward wall 48, a first sidewall 49, a top wall 51, a backwall (not shown), and a second sidewall (not shown). The housing preferably comprises a first half 13a and a second half 13b; each half 13a, 13b includes a reciprocal male/female fastening mechanism such as, but not limited to, snaps, interlocking parts, depressed plunger and aperture, clips, clasps, combinations thereof, and the like, that are integrally formed therein. A nozzle shroud 46 positioned on a forward wall 48 of microplasma gun 12 may contain a nozzle insert 50 and a center aperture 52. The nozzle insert 50 may be threadingly attached to an end of nozzle shroud 46. A shield gas cap 54 may be positioned adjacent nozzle shroud 46. An insulator 56 may be positioned between a shield gas cap 54 and nozzle shroud 46 to electrically isolate shield gas cap 54 from nozzle shroud 46. Shield gas cap 54 may be pressed to fit over insulator 56 and onto nozzle shroud 46. Shield gas cap 54 includes a center aperture 60 to permit high velocity arc gas to pass through and into the electric arc. Shield gas cap 54 also includes a plurality of through apertures 58 for permitting shield gas to flow therethrough and shield the arc gas from ambient atmosphere. The shield gas flow rate may be about 2 to 4 liters per minute depending upon the intended application. The narrow spray pattern of microplasma stream 21 may also be controlled by the nozzle opening size.

Referring now to FIGS. 2 and 3, a cathode holder 26 includes a cathode 28 concentrically disposed within an insulating sleeve 18 and secured by an internal threaded mating juncture (not shown). Cathode holder 26 includes an insulating cap 27 for the holder's insertion and removal and a plurality of threads 30 for threadingly engaging insulating sleeve 18 and cathode 28 within microplasma gun 12. Insulating cap 27 and insulating sleeve 18 preferably comprise a non-conducting, insulating material such as phenolic materials, ceramic materials, polyetheretherketone materials, combinations thereof, and the like. When engaged, cathode 28 extends through center aperture 52 of nozzle shroud 46. Insulated sleeve 18 may also include an O-ring seal 32 to seal the leak path that is created at the interface between insulated sleeve 18 and microplasma gun 12. Referring specifically now to FIG. 3, cathode 28 may comprise a body having a tip with a distal end. The tip may comprise a substantially flat upper surface formed at an angle of approximately 8 degrees to 30 degrees, preferably approximately 8 degrees to 20 degrees, and more preferably approximately 8 degrees to 10 degrees. The distal end of the tip comprises a height of about 0.008 inches to 0.030 inches, preferably about 0.008 inches to 0.020 inches, and most preferably about 0.008 inches to 0.010 inches or, in the alternative, a height measuring approximately 10% to 20% of the diameter of cathode 28.

Referring again to FIG. 2, anode 16 comprises a metal or alloy having a melting point temperature higher than the intended operating temperature of the anode in microplasma gun 12. Preferably, anode 16 comprises a commercially available pure sintered tungsten, or sintered tungsten blended with oxides exhibiting refractory characteristics, such as but not limited to thoria, lanthania, ceria, zirconia, and the like, and preferably blended with 2% thoria. These tungsten and oxide blends may be cryogenically treated in order to enhance and stabilize their performance in the microplasma spray gun apparatus. Conventional anodes are typically formed from a copper-tungsten alloy and provide a very limited service life of approximately 10 to 20 minutes in microplasma spray coating apparatus 10. Copper and other similar metals have melting point temperatures that are lower than the anode operating temperature. As a result, these metals can melt and cause an upper edge of the anode to become molten and initiate cavitation and erosion. In order to produce high quality coatings, the edge of the anode must remain relatively sharp. To achieve this, a commercially pure sintered tungsten material has been developed to produce a more robust anode. Test results using anodes made from sintered tungsten material has shown marked improvements in the erosion resistance over prior art anodes. Utilizing commercially pure tungsten in anode 16 has increased the service life of anode 16 such that anode 16 may be utilized in operation for approximately 10 hours to 20 hours.

Electric arc 20 may be generated between anode 16 and cathode 28 of the microplasma gun 12. The arc gas may originate from an arc gas source 15 comprising a single gas or a mixture of gases, for example, a duplex gas, may originate from multiple gas sources interconnected with each other through a mixing apparatus and fed to the microplasma spray coating apparatus 10. The arc gas source 15 is connected to microplasma gun 12 via conduit having a length sufficient to permit slack so that the user of apparatus 10 may walk or climb, ascending or descending, with microplasma gun 12 a distance sufficient to perform the intended application without interrupting the flow of the arc gas to microplasma gun 12. Preferably, arc gas source 15 comprising a single gas is particularly advantageous over utilizing a duplex gas mixture or multiple gas sources and a mixing apparatus due to lower costs and fewer materials and parts. However, a pre-mixed duplex gas mixture contained in a single arc gas source may also be utilized efficiently and cost effectively. The arc gas may comprise, but is not limited to, any inert gas and preferably comprises argon, and a representative duplex gas mixture may comprise argon and hydrogen, and preferably, about 98% argon gas and about 2% hydrogen gas.

The arc gas may be admitted into the electric arc formed between anode 16 and cathode 28. One skilled in the art will recognize that in practice the arc gas can be emitted prior to generating the electric arc. Generally, the arc gas flow rate into microplasma spray coating apparatus 10 may be about 1.5 to 3 liters per minute. The electric arc ionizes the arc gas to create microplasma gas stream 21. The ionization process removes electrons from the arc gas, thus causing the arc gas to become temporarily unstable. The arc gas heats up to about 20,000° F. to 30,000° F. as it restabilizes. The microplasma gas stream then cools rapidly after passing through the electric arc.

A powdered material injector 22 injects an amount of powdered material 34 into plasma gas stream 21. Powdered material 34 is heated and super-plasticized in the microplasma stream and is deposited on a workpiece where the deposited powdered material may cool and re-solidify to form the microplasma spray coating. Powdered material injector 22 may comprise a powder hopper 36. Powder hopper 36 holds powder material 34 prior to being injected into microplasma gas stream 21 by powder injector 22. Hopper 36 may be attached to microplasma gun 12 via a connector 38 formed on microplasma gun 12. Powdered material 34 may be channeled through a discharge orifice 40 and controlled by a valve 42 positioned therein. The powdered material 34 may be injected into microplasma gas stream 21 either through gravity feed or through a pressurized system (not known). In the alternative, powder material 34 may also be injected into microplasma stream 21 via a powder feeder hose from a standard powder feeder (not shown). Microplasma spray gun may be oriented between a positive 45° angle and a negative 45° angle relative to a normal axis of the workpiece, while still providing adequate material coating with a gravity feed system. A pressure feed system provides unlimited angles and/or orientation for microplasma gun 12.

Whether a gravity feed, a pressurized system or a standard powder feeder is employed, connector 38 or powdered feeder hose (not shown) preferably has a length sufficient to permit slack so that the user of apparatus 10 may walk or climb a distance sufficient to perform the intended application. One skilled in the art will appreciate the fact that as the operator moves with the portable unit and powder feeder hose, the operator may descend to a point below or ascend to a point above powder hopper 36. The pressure feed systems contemplated for use herein preferably have the power capacity to uniformly force powdered material 34 through a powder feed hose positioned above or below powder hopper 36 and permit microplasma gun 12 to uniformly deliver powdered material 34 at unlimited angles and/or orientation.

A shutoff control valve 42 also controls powder material 34 feed rate into plasma gas stream 21. Powdered material 34 may be transferred to the workpiece at a rate of about 1 to 30 grams per minute. Microplasma gun 12 may typically apply the microplasma spray coating from distances ranging from about 1.5 inches to 6.5 inches onto the workpiece, but may vary depending upon the coating application requirements. For example, powdered material 34 may comprise any metallic, ceramic, carbide, cermet, plastic or other non-metallic coating material that can be typically plasma sprayed. For example, powdered material may be include, but is not limited to, copper alloys, aluminum alloys, nickel alloys, e.g., nickel-aluminum alloy (95%/5%), in combination with a ceramic material such as a ceramic oxide including, but not limited to, yttria stabilized zirconia, aluminum oxide and the like.

Microplasma spray gun 12, and microplasma spray coating apparatus 10, generates a relatively low noise level compared to conventional plasma spray coating apparatus. For instance, conventional plasma spray coating apparatus generate a noise level of about 120 decibels when taking into account the surrounding equipment and plasma spray coating apparatus itself. In the present invention, the microplasma spraying apparatus 10 may generate a noise level of about 40 decibels to 70 decibels during operation. More particularly, the microplasma spray coating apparatus 10 alone may generate a noise level of about 40 decibels to 55 decibels, and when surrounding equipment is included, the noise level may elevate to a range of about 55 decibels to 70 decibels. In both instances of operation, microplasma spray coating apparatus 10 of the present invention generates a noise level far lower than conventional plasma spray coating apparatus known today. In addition, current United States Government regulations require hearing protection when environmental noise reaches 85 decibels. As a result, microplasma spray coating apparatus 10 also meets Government regulated safety protocols.

Coolant fluid, such as water or the like, may be utilized to cool the microplasma gun 12. The cooling fluid may be delivered to the microplasma gun 12 via a cooling fluid hose 62. The cooling fluid traverses through internal passages (not shown) in the microplasma gun 12 and flows through an inlet passage 64, into an anode holder 66 and back through an outlet passage 68. The cooling fluid reduces the temperature of anode 16 during operation of the microplasma gun 12. The cooling flow rate may be approximately 1.0–1.5 gallons per minute. A second conduit 70 may be connected to the microplasma gun 12 in order to provide electrical power, arc gas, and chilled gas to the microplasma gun 12. Second conduit 70 preferably has a length sufficient to permit slack so that the user of apparatus 10 may walk or climb a distance with microplasma gun 12 sufficient to perform the intended application.

Figure 4:
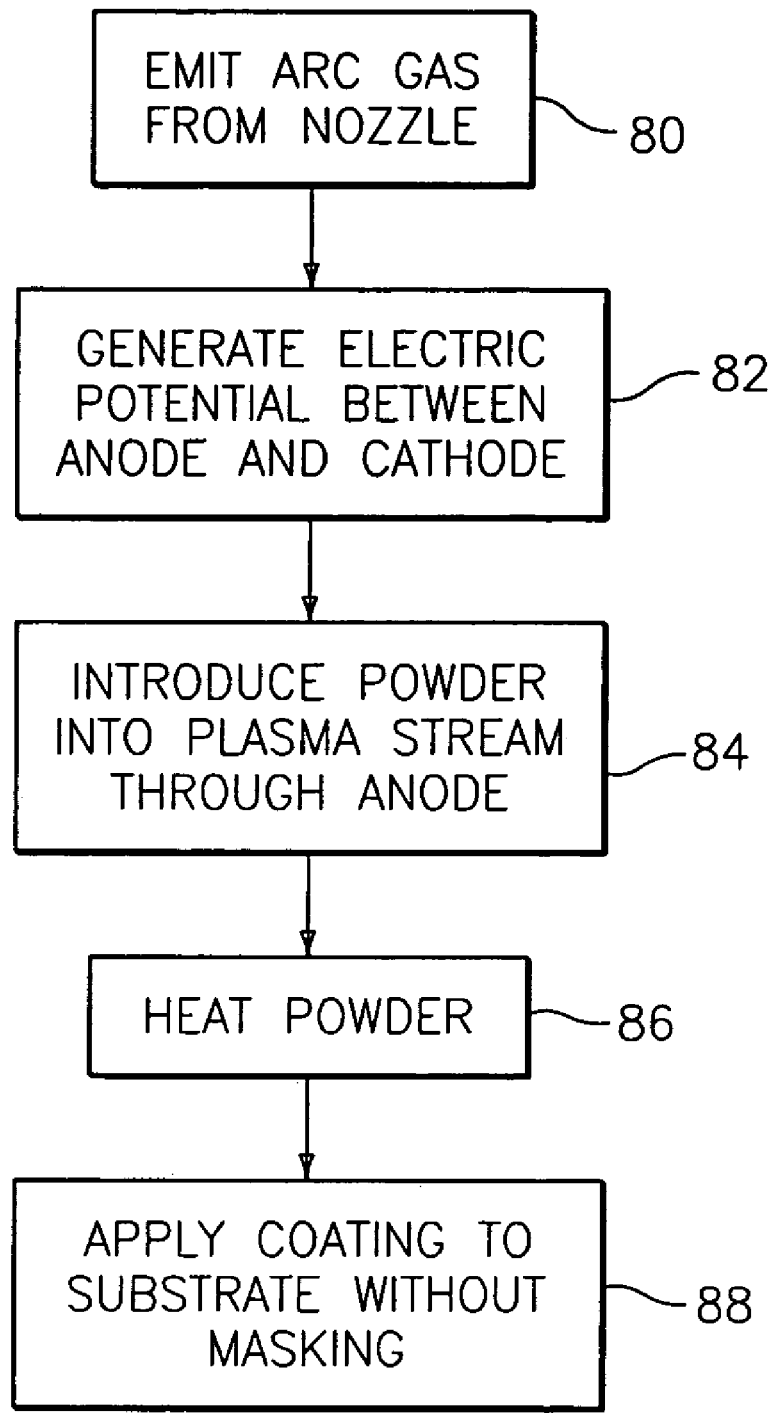
FIG. 4 is a flowchart representing a process for applying a microplasma spray coating to a workpiece in accordance with the present invention.

Referring now to FIG. 4, a block diagram generally illustrating the operation of microplasma spray coating apparatus 10 is illustrated. Initially, at block 80, arc gas is emitted from nozzle insert 50. An electric potential is generated between anode 16 and cathode 28 of the microplasma spray gun 12 and is directed through the arc gas, as described in block 82. Arc gas may be directed through the electric potential to create plasma stream 21. At block 84, powder material 34 is injected into plasma stream 21. At block 86, the microplasma stream heats the powder material 34 to a "super plasticized" condition such that the powder material 34 is malleable when it is applied to the workpiece. "Superplasticized" refers to the powdered material existing in a molten state, e.g., molten droplets, that freeze upon impact with the substrate surface and an entrained solid particulate state that melts upon impact with the substrate surface. At block 88, powder material 34 is applied to an unmasked workpiece. Powder material 34 then cools and solidifies as a hard coating on the workpiece. Generally, the thickness of the microplasma spray coating may be dependent upon the intended application such as coating an OEM part or applying the coating for repair purposes.

Figure 5:
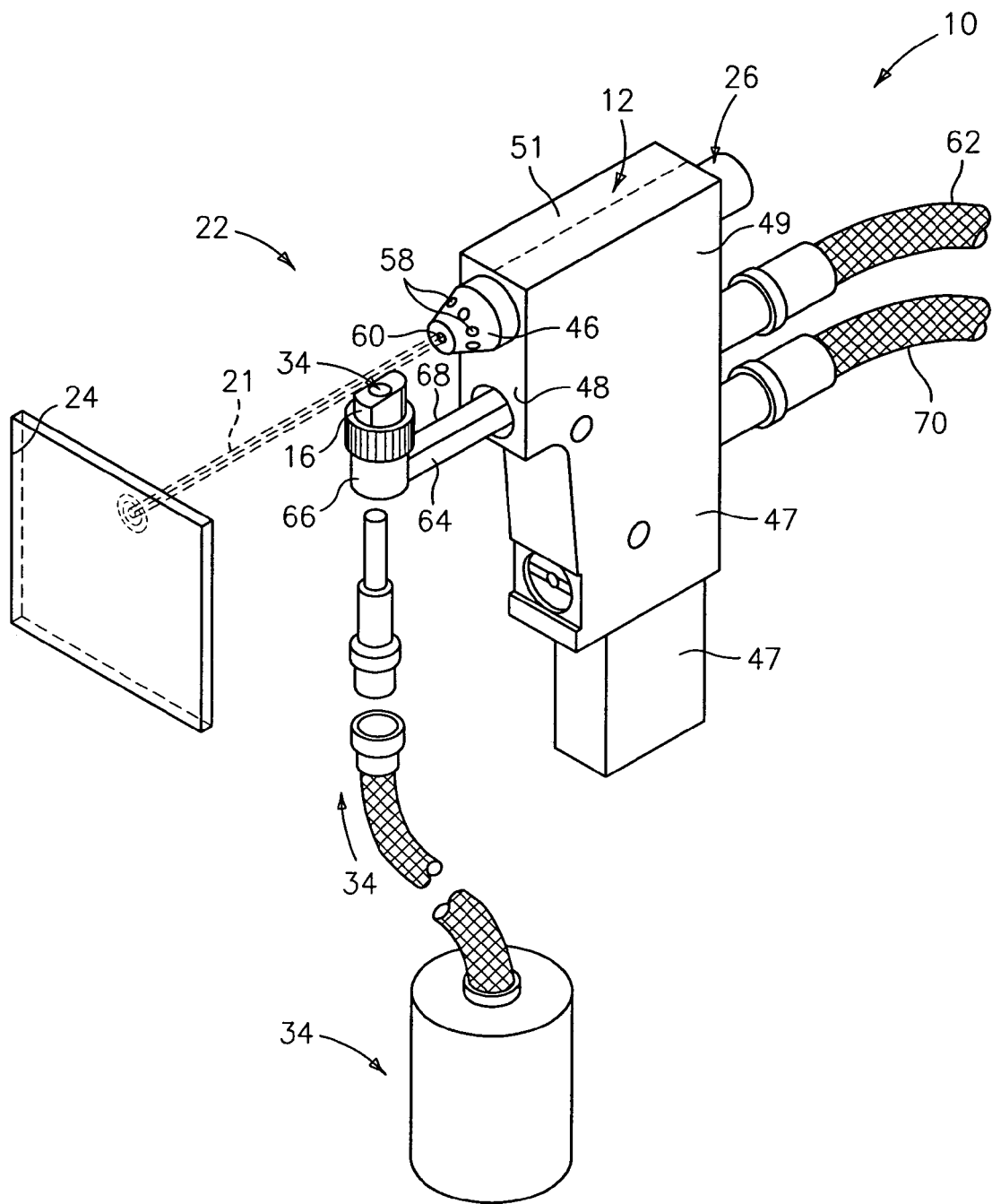
FIG. 5 is an assembled perspective view of the microplasma spray coating apparatus of FIG. 1 in operation.

Referring now to FIG. 5, a workpiece may be spray coated with powder material 34 utilizing the microplasma spray coating apparatus described herein. Plasma gas stream 21 may be directed toward the workpiece being coated. Microplasma gun 12 may be operated at a relatively low power range of about 0.5 kilowatts to about 4 kilowatts. The lower power output of the microplasma gun 12 and microplasma spray coating apparatus 10 significantly reduces the heat flow into the workpiece over that of conventional plasma coating methods. Depending upon the size of the workpiece, maximum surface temperature of the workpiece achieved by the application of the microplasma spray coating process described herein may be about 200° F. As a result, microplasma spray coating apparatus 10 is capable of applying a microplasma spray coating to a thin wall area of the workpiece, without distortion resulting due to localized stress caused by high thermal gradients.

Due to the low power output of microplasma spray coating apparatus 10 and the narrow aperture of microplasma gun 12, microplasma spray gun 12 may apply powdered coating material in a localized area on a workpiece at a size of approximately $\frac{1}{10}^{th}$ to approximately $\frac{1}{20}^{th}$, and preferably approximately $\frac{1}{15}^{th}$, that of conventional plasma stream coating methods and apparatus. The size and diameter of the microplasma stream of microplasma spray coating apparatus 10 permits accurate surface coating even with a hand-held device as contemplated herein. For example, the microplasma stream generated by microplasma spray coating apparatus 10 may comprise a width of about 0.5 millimeters to about 5 millimeters. Due to the size of the microplasma spray coating stream of the microplasma spray coating apparatus, the stream may be applied in narrow strips or in isolated areas on the workpiece which substantially eliminates the need for masking or otherwise covering the workpiece in areas where the coating is not desired.

One or more embodiments of the present invention have been described. Nevertheless, it will be understood that various modifications may be made without departing from the spirit and scope of the invention. Accordingly, other embodiments are within the scope of the following claims.

What is claimed is:

1. A portable, hand-held microplasma spray coating apparatus, comprising:
    an anode, a cathode and an arc gas emitter disposed in a housing of a microplasma spray gun;
    a powder feeding system connected to said housing;
    a cooling system connected to said housing; and
    a power source connected to the apparatus, wherein said powder feeding system, said cooling system and said power source are detachably mounted on a mobile platform.

2. The portable, hand-held microplasma apparatus of claim 1, wherein said anode comprises a sintered tungsten material.

3. The portable, hand-held microplasma apparatus of claim 1, wherein said cathode is concentrically disposed in an insulating sleeve having said cathode extending therefrom and sealingly engaged to said housing by a plurality of threads and an insulating cap.

4. The portable, hand-held microplasma apparatus of claim 3, wherein said cathode comprises a body having a tip with a distal end.

5. The portable, hand-held microplasma apparatus of claim 4, wherein said tip comprises a substantially flat upper surface formed at an angle of between approximately 8 degrees to 30 degrees.

6. The portable, hand-held microplasma apparatus of claim 4, wherein said distal end of said tip comprises a height of about 0.008 inches to 0.030 inches.

7. The portable, hand-held microplasma apparatus of claim 4, wherein said distal end of said tip comprises a height measuring approximately 10% to 20% of a diameter of said electrode.

8. The portable, hand-held microplasma apparatus of claim 1, wherein said anode comprises an electrically conductive material.

9. The portable, hand-held microplasma apparatus of claim 8, wherein said electrically conductive material comprises tungsten blended with an oxide selected from the group consisting of thoria, lanthania, ceria and zirconia.

10. The portable, hand-held microplasma apparatus of claim 1, wherein said arc gas emitter supplies an inert arc gas into an electric arc generated by said anode and said cathode.

11. The portable, hand-held microplasma apparatus of claim 10, further comprising a plasma stream generated by said inert arc gas passing through said electric arc.

12. The portable, hand-held microplasma apparatus of claim 10, wherein said inert arc gas is a single gas source or a duplex gas source.

13. The portable, hand-held microplasma apparatus of claim 12, wherein said single gas source is argon.

14. The portable, hand-held microplasma apparatus of claim 12, wherein said duplex gas source comprises a mixture of argon and hydrogen.

15. The portable, hand-held microplasma apparatus of claim 1, wherein said powder feeding system comprises a powder hopper connected to said housing through a conduit to a powder injector nozzle extending through an aperture formed in said anode.

16. The portable, hand-held microplasma apparatus of claim 15, wherein said powder hopper holds and feeds a quantity of powdered material through said powder injector nozzle into a plasma stream generated by an inert arc gas passing through an electric arc generated by said anode and said cathode.

17. The portable, hand-held microplasma apparatus of claim 15, wherein said powder hopper feeds approximately 1 to 30 grams of powdered material per minute into said powder injector nozzle.

18. The portable, hand-held microplasma apparatus of claim 15, wherein said conduit comprises a length sufficient to permit a user to move a distance sufficient to perform an application.

19. The portable, hand-held microplasma apparatus of claim 1, wherein said cooling system comprises a cooling fluid conduit connected to said housing through an inlet passage into an anode holder of said housing and exiting through an outlet passage.

20. The portable, hand-held microplasma apparatus of claim 19, wherein said cooling fluid conduit provides a cooling fluid at a flow rate of approximately 1.0 to 1.5 gallons per minute.

21. The portable, hand-held microplasma apparatus of claim 19, wherein said cooling fluid conduit comprises a length sufficient to permit a user to move a distance sufficient to perform an application without interrupting a flow of a powder material.

22. The portable, hand-held microplasma apparatus of claim 1, wherein said power source generates a power output of about 0.5 kilowatts to about 4 kilowatts.

23. The portable, hand-held microplasma apparatus of claim 1, wherein said power source is rechargeable.

24. The portable, hand-held microplasma apparatus of claim 1, wherein said power source is connected to said microplasma spray gun by a conduit having a length sufficient to permit a user to move a distance sufficient to perform an application without interrupting a flow of a powder material.

25. The portable, hand-held microplasma apparatus of claim 1, wherein said mobile platform comprises a vehicle.

26. The portable, hand-held microplasma apparatus of claim 1, further comprising a compressed carrier gas source connected to said housing through a second conduit.

27. The portable, hand-held microplasma apparatus of claim 26, wherein said second conduit comprises a length sufficient to permit a user to move a distance sufficient to perform an application.

28. The portable, hand-held microplasma apparatus of claim 1, wherein said housing comprises a forward wall having a nozzle shroud disposed thereupon, a nozzle insert concentrically disposed within an aperture of said nozzle shroud, and a shield gas cap disposed upon an insulator of said nozzle shroud.

29. The portable, hand-held microplasma apparatus of claim 1, further comprising a portable filter system comprising a high efficiency particulate air filter comprising a vacuum device and a collection area for holding a quantity of excess powder material and microplasma spray.

30. A portable, hand-held microplasma spray coating apparatus mounted to a mobile platform, comprising:

an anode, a cathode and an arc gas emitter disposed in a housing;

a powder feeding system connected to said housing;

a cooling system connected to said housing;

a power source capable of generating a power output of about 0.5 kilowatts to about 4 kilowatts connected to the apparatus; and a filter system comprising a high efficiency particulate air filter, wherein said powder feeding system, said cooling system, said power source and said filter system are mounted on a mobile platform.

* * * * *